United States Patent
Nappier et al.

(10) Patent No.: US 8,438,270 B2
(45) Date of Patent: May 7, 2013

(54) SYSTEM AND METHOD FOR CORRELATING NETWORK IDENTITIES AND ADDRESSES

(75) Inventors: Jason Nappier, Bowie, MD (US); Ron Gula, Marriotsville, MD (US)

(73) Assignee: Tenable Network Security, Inc., Columbia, MD (US)

( * ) Notice: Subject to any disclaimer, the term of this patent is extended or adjusted under 35 U.S.C. 154(b) by 290 days.

(21) Appl. No.: 12/693,803

(22) Filed: Jan. 26, 2010

(65) Prior Publication Data
US 2011/0185055 A1    Jul. 28, 2011

(51) Int. Cl.
*G06F 15/173* (2006.01)
(52) U.S. Cl.
USPC ............................ 709/224; 709/220; 709/223
(58) Field of Classification Search .................. 709/224, 709/223, 220
See application file for complete search history.

(56) References Cited

U.S. PATENT DOCUMENTS

| | | | |
|---|---|---|---|
| 4,525,599 A | 6/1985 | Curran et al. | 178/22.08 |
| 5,541,997 A | 7/1996 | Pappas et al. | 380/49 |
| 5,572,729 A | 11/1996 | Giordano et al. | 395/616 |
| 5,715,391 A | 2/1998 | Jackson et al. | 395/200.01 |
| 5,721,819 A | 2/1998 | Galles et al. | 395/200.15 |
| 5,838,919 A | 11/1998 | Schwaller et al. | 395/200.54 |
| 5,844,817 A | 12/1998 | Lobley et al. | 364/578 |
| 6,154,775 A | 11/2000 | Coss et al. | 709/225 |
| 6,266,774 B1 | 7/2001 | Sampath et al. | 713/201 |
| 6,324,656 B1 | 11/2001 | Gleichauf et al. | 714/37 |
| 6,393,568 B1 | 5/2002 | Ranger et al. | 713/188 |
| 6,415,321 B1 | 7/2002 | Gleichauf et al. | 709/224 |
| 6,487,666 B1 | 11/2002 | Shanklin et al. | 713/201 |
| 6,499,107 B1 | 12/2002 | Gleichauf et al. | 713/201 |
| 6,510,509 B1 | 1/2003 | Chopra et al. | 712/13 |
| 6,606,663 B1 | 8/2003 | Liao et al. | 709/229 |
| 6,704,874 B1 | 3/2004 | Porras et al. | 713/201 |
| 6,711,127 B1 | 3/2004 | Gorman et al. | 370/230 |
| 6,789,202 B1 | 9/2004 | Ko et al. | 713/201 |
| 6,847,982 B2 | 1/2005 | Parker et al. | 707/200 |
| 6,873,617 B1 | 3/2005 | Karras | 370/389 |
| 6,882,728 B1 | 4/2005 | Takahashi et al. | 380/201 |
| 6,886,020 B1 | 4/2005 | Zahavi et al. | 707/204 |

(Continued)

OTHER PUBLICATIONS

Wack, John, et al., NIST Special Publication 800-42, "Guideline on Network Security Testing", Computer Security Division, National Institute of Standards and Technology, Oct. 2003, pp. 1-92.

(Continued)

*Primary Examiner* — Nicholas Taylor
(74) *Attorney, Agent, or Firm* — Pillsbury Winthrop Shaw Pittman LLP (57) ABSTRACT

The system and method for correlating network identities and addresses described herein may include a log correlation engine distributed on a network that identifies relationships between certain network identities and Internet Protocol (IP) and Ethernet addresses in the network. In particular, the log correlation engine may analyze various event logs that describe activity in a network to learn relationships between network identities and network addresses and generate alerts in response to discovering changes in the learned relationships. For example, the log correlation engine may identify authentication events described in the logs to map network identities to IP addresses, and may further analyze the logs to map the IP addresses to Ethernet addresses. Thus, the log correlation engine may discover new and changed relationships between the network identities, the IP addresses, and the Ethernet addresses.

20 Claims, 3 Drawing Sheets

U.S. PATENT DOCUMENTS

| | | | |
|---|---|---|---|
| 6,952,779 B1 | 10/2005 | Cohen et al. | 713/200 |
| 6,957,348 B1 | 10/2005 | Flowers et al. | 713/201 |
| 6,968,377 B1 | 11/2005 | Gleichauf et al. | 709/224 |
| 7,017,186 B2 | 3/2006 | Day | 726/23 |
| 7,073,198 B1 | 7/2006 | Flowers et al. | 726/25 |
| 7,093,287 B1 | 8/2006 | Gusler et al. | 726/13 |
| 7,120,148 B1 | 10/2006 | Batz et al. | 370/392 |
| 7,134,141 B2 | 11/2006 | Crosbie et al. | 726/23 |
| 7,139,819 B1 | 11/2006 | Luo et al. | 709/223 |
| 7,162,742 B1 | 1/2007 | Flowers et al. | 726/25 |
| 7,181,769 B1 | 2/2007 | Keanini et al. | 726/23 |
| 7,237,264 B1 | 6/2007 | Graham et al. | 726/23 |
| 7,243,366 B2 | 7/2007 | Medvinsky et al. | 726/2 |
| 7,272,646 B2 * | 9/2007 | Cooper et al. | 709/223 |
| 7,290,145 B2 | 10/2007 | Falkenthros | 713/182 |
| 7,310,687 B2 | 12/2007 | Psounis et al. | 709/247 |
| 7,324,551 B1 | 1/2008 | Stammers | 370/468 |
| 7,509,681 B2 | 3/2009 | Flowers et al. | 726/25 |
| 7,594,273 B2 | 9/2009 | Keanini et al. | 726/25 |
| 7,653,647 B2 | 1/2010 | Borthakur et al. | 707/102 |
| 7,661,134 B2 | 2/2010 | Radatti | 726/22 |
| 7,735,100 B1 | 6/2010 | Sallam | 719/330 |
| 7,739,377 B2 | 6/2010 | Benedetti et al. | 709/224 |
| 7,761,918 B2 | 7/2010 | Gula et al. | 726/23 |
| 7,904,479 B2 | 3/2011 | Zuk | 707/791 |
| 7,908,254 B2 | 3/2011 | Suermondt et al. | 707/698 |
| 7,926,113 B1 | 4/2011 | Gula et al. | 726/25 |
| 7,966,358 B2 | 6/2011 | Deolalikar et al. | 708/250 |
| 8,135,815 B2 | 3/2012 | Mayer | 709/223 |
| 8,302,198 B2 | 10/2012 | Deraison | 726/25 |
| 2001/0034847 A1 | 10/2001 | Gaul, Jr. | 713/201 |
| 2002/0019945 A1 | 2/2002 | Houston et al. | 713/201 |
| 2002/0093527 A1* | 7/2002 | Sherlock et al. | 345/736 |
| 2002/0100023 A1 | 7/2002 | Ueki et al. | 717/127 |
| 2002/0107841 A1 | 8/2002 | Hellerstein et al. | 707/3 |
| 2002/0166063 A1 | 11/2002 | Lachman, III et al. | 713/200 |
| 2003/0051026 A1 | 3/2003 | Carter et al. | 709/224 |
| 2003/0056116 A1 | 3/2003 | Bunker, V et al. | 713/201 |
| 2003/0135517 A1 | 7/2003 | Kauffman | 707/103 R |
| 2003/0145225 A1 | 7/2003 | Bruton, III et al. | 713/201 |
| 2003/0196123 A1 | 10/2003 | Rowland et al. | 713/201 |
| 2004/0003266 A1 | 1/2004 | Moshir et al. | 713/191 |
| 2004/0015719 A1 | 1/2004 | Lee et al. | 713/201 |
| 2004/0042470 A1 | 3/2004 | Cooper et al. | 370/401 |
| 2004/0193918 A1* | 9/2004 | Green et al. | 713/201 |
| 2005/0068928 A1 | 3/2005 | Smith et al. | 370/338 |
| 2005/0108578 A1 | 5/2005 | Tajalli et al. | 713/201 |
| 2005/0128988 A1 | 6/2005 | Simpson et al. | 370/338 |
| 2005/0188419 A1 | 8/2005 | Dadhia et al. | 726/1 |
| 2005/0203886 A1 | 9/2005 | Wong | 707/3 |
| 2005/0203921 A1 | 9/2005 | Newman et al. | 707/100 |
| 2005/0229255 A1 | 10/2005 | Gula et al. | 726/23 |
| 2006/0010245 A1 | 1/2006 | Carnahan | 709/231 |
| 2006/0018466 A1 | 1/2006 | Adelstein et al. | 380/46 |
| 2006/0117091 A1 | 6/2006 | Justin | 709/217 |
| 2006/0184682 A1 | 8/2006 | Suchowski et al. | 709/229 |
| 2007/0028304 A1 | 2/2007 | Brennan | 726/24 |
| 2007/0169190 A1 | 7/2007 | Kolton et al. | 726/22 |
| 2007/0271598 A1* | 11/2007 | Chen et al. | 726/4 |
| 2007/0277238 A1 | 11/2007 | Margalit et al. | 726/22 |
| 2008/0022400 A1 | 1/2008 | Cohen et al. | 726/22 |
| 2008/0047009 A1 | 2/2008 | Overcash et al. | 726/23 |
| 2008/0072285 A1* | 3/2008 | Sankaran et al. | 726/2 |
| 2009/0013141 A1 | 1/2009 | Kinoshita | 711/163 |
| 2009/0049016 A1 | 2/2009 | Sakamoto | 707/3 |
| 2009/0177782 A1* | 7/2009 | Blatherwick et al. | 709/228 |
| 2010/0030780 A1 | 2/2010 | Eshghi et al. | 707/6 |
| 2010/0043066 A1 | 2/2010 | Miliefsky | 726/9 |
| 2010/0114842 A1 | 5/2010 | Forman et al. | 707/692 |
| 2010/0281539 A1 | 11/2010 | Burns et al. | 726/23 |
| 2011/0185431 A1 | 7/2011 | Deraison | 726/25 |
| 2011/0231935 A1 | 9/2011 | Gula et al. | 726/25 |
| 2011/0277034 A1 | 11/2011 | Hanson | 726/25 |
| 2011/0314245 A1* | 12/2011 | Hanes et al. | 711/164 |

OTHER PUBLICATIONS

Deraison, Renaud, et al., "Passive Vulnerability Scanning Introduction to NeVo", Revision 9, Tenable Network Security, Aug. 2003, pp. 1-13.

Deraison, Renaud, et al., "Unified Security Monitoring (USM); Real-Time Situational Awareness of Network Vulnerabilities, Events and Configurations", Revision 2, Tenable Network Security, Jan. 27, 2009, 12 pages.

Zhang, Yin, et al.,"Detecting Backdoors", *Proceedings of the 9th USENIX Security Symposium*, Denver, Colorado, Aug. 2000, 11 pages.

"Basic Cryptanalysis", Department of the Army, Field Manual No, 34-40-2, Sep. 13, 1990, 363 pages.

Kim, Gene H., et al., "The Design and Implementation of Tripwire: A File System Integrity Checker", *Proceedings of the 2nd ACM Conference on Computer and Communications Security*, 1994, (Purdue Technical Report CSD-TR-93-071), 18 pages.

Oline, Adam, et al., "Exploring Three-Dimensional Visualization for Intrusion Detection", *Workshop on Visualization for Computer Security*, IEEE, Oct. 26, 2005, 9 pages.

* cited by examiner

Figure 1

Example Asset Schema:

| Type (210) | Place (220) | Description (230) |
|---|---|---|
| Web Server | Tokyo | Apache |
| Firewall | Building 5 | IIS |
| Router | New York | Cisco 6500 |
| Mail Server | Chicago | Checkpoint NG |
| Desktop | Australia | Checkpoint 4 |

400

SYSTEM AND METHOD FOR CORRELATING NETWORK IDENTITIES AND ADDRESSES

CROSS-REFERENCE TO RELATED APPLICATIONS

This application is related to co-pending U.S. patent application Ser. No. 10/863,238, entitled "System and Method for Managing Network Vulnerability Analysis Systems," filed Jun. 9, 2004, co-pending U.S. patent application Ser. No. 11/016,761, entitled "System and Method for Scanning a Network," filed Dec. 21, 2004, and U.S. patent application Ser. No. 11/313,710, entitled "System and Method for Managing Events," filed Dec. 22, 2005, now abandoned, the contents of which are hereby incorporated by reference in their entirety.

FIELD OF THE INVENTION

The invention relates to a system and method for correlating network identities and addresses, and in particular, to analyzing various event logs that describe activity in a network to learn new or changed relationships between network identities and network addresses, and furthermore, to scanning hardware devices in the network to learn network device addresses that can be used to track and control changes and activity in the network.

BACKGROUND OF THE INVENTION

Almost any device within a particular network typically generates various events that describe activity associated with the device. However, correlating logs with events that may have been generated by many different devices distributed across a network can often be very difficult because the logs may be written in different formats or describe different types of activity, among other things. Furthermore, many event logs often repeat a particular event multiple times, creating large event volumes that can be difficult to analyze in a manner that extracts useful information. In modern information technology environments, where change management and access control presents important challenges, the large event volumes that existing correlation systems generate can substantially interfere with network management.

For example, historically tracking user activity in organizations such as university environments or campus-wide networks that do not have centralized authentication and access controls can be particularly difficult. Nonetheless, tracking user activity may be important to proper network management because certain activity patterns may reflect security breaches, compliance issues, or other problems in the network. In addition, tracking network addresses for hardware devices can be a daunting task, yet having an ability to track network addresses can have substantial value for tracking changes and activity in the network. However, existing systems tend to use techniques that fall short in suitably scouring networks to obtain and maintain updated network device addresses. For example, due to the large event volumes that existing correlation systems generate, events must be normalized to a particular format that may be unfamiliar or difficult to analyze, and processing the large event volumes can interfere with detecting and managing changes and activity in real-time.

Existing systems suffer from these and other problems.

SUMMARY OF THE INVENTION

According to one aspect of the invention, the system and method described herein may generally correlate identities and addresses in a network. In particular, a log correlation engine may receive various event logs from sources distributed across the network (e.g., firewall logs, router logs, server logs, device logs, operating system logs, web logs, application logs, or other security monitoring logs). The log correlation engine may then normalize and analyze the event logs, which may describe activity in the network, to learn relationships between identities and addresses in the network and generate alerts in response to detecting changes in the learned relationships. Additionally, an active vulnerability scanner may scan hardware devices in the network to learn network device addresses that can then be used to track changes and activity in the network, and further to control changes and activity in the network. Further, in one implementation, a passive vulnerability scanner may observe traffic, sessions, or other activity that occurs in the network to learn and track relationships between network identities and addresses. Thus, the log correlation engine, the active vulnerability scanner, and the passive vulnerability scanner may collectively provide various configuration and activity information that can be used to react quickly to incidents and trends that may impact security or compliance in the network.

According to one aspect of the invention, the system and method described herein may correlate network identities and addresses based on activity that occurs in the network to automatically track user identities and network addresses. In particular, in response to the log correlation engine receiving the event logs from the various sources distributed across the network, the log correlation may identify one or more of the event logs containing information that describes a network identity or Internet Protocol (IP) address for a certain user. For example, the log correlation engine may identify any logs that contain information describing a login to an authentication system, authenticated email, or other activity that identifies an IP address for a particular user, and the identified logs may then be correlated to maintain a mapping between users and IP addresses. Furthermore, the log correlation engine may analyze Dynamic Host Configuration Protocol (DHCP) logs to maintain a mapping between IP addresses and Ethernet or Media Access Control (MAC) addresses. Thus, the user to IP address mapping and the IP address to Ethernet address mapping may be cross-referenced to learn relationships between the users, the IP addresses, and the Ethernet addresses. In one implementation, in response to discovering new or changed relationships between the users, the IP addresses, and the Ethernet addresses, one or more alerts may be generated for further analysis.

According to one aspect of the invention, the system and method described herein may correlate network identities and addresses in the network to automatically track network addresses for hardware devices in the network. In particular, the active vulnerability scanner may discover Ethernet addresses for various remote hosts or other devices in the network. In addition, for any remote hosts or other devices running multiple hardware or virtual network interfaces, the active vulnerability scanner may discover multiple Ethernet addresses that correspond to the multiple network interfaces. The discovered Ethernet addresses may then be used to create dynamic asset lists that describe certain types of devices (e.g., a MAC prefix assigned to every CISCO® device may be used to automatically create an asset list describing the CISCO® devices in the network). In one implementation, the passive vulnerability scanner may further track Ethernet addresses for any new hosts or devices in the network, wherein the new hosts or devices may be reported in a log that contains Ethernet addresses observed in IP packets associated with the new hosts or devices. In one implementation, the log correlation engine may then parse the logs reported from the passive vulnerability scanner in addition to any logs reported from DHCP, arpwatch, or other sources that contain Ethernet addresses. For example, any particular arpwatch log may generally describe pairings between IP addresses and MAC addresses in the network and time stamps that describe when the pairings appeared on the network. Thus, the log correlation engine may generate alerts in response to discovering that new hardware Ethernet addresses have become active, whereby the active vulnerability scanner, the passive vulnerability scanner, and the log correlation engine may collectively track hardware Ethernet addresses to monitor and control changes and activity in the network.

According to one aspect of the invention, the system and method described herein may correlate network identities and addresses to fulfill compliance and security requirements in the network. In particular, many compliance regulations such as Payment Card Industry (PCI) and Federal Information Security Management Act (FISMA) require log aggregation, storage, and search capabilities, whereby vulnerability and configuration auditing requirements for such regulations can be fulfilled with event log searching and management capabilities provided by the system and method described herein. Furthermore, organizations subject to mandatory breach disclosure laws may fulfill requirements for disclosing breaches through direct access to the raw event logs, correlated events, configurations, and vulnerabilities. Moreover, the raw event logs, correlated events, configurations, and vulnerabilities may provide information that can help incident responders make immediate and correct decisions during a breach, which can not only result in limiting an ongoing breach, but also minimize a chance of over-reporting or under-reporting the extent of the breach.

Other objects and advantages of the invention will be apparent to those skilled in the art based on the following drawings and detailed description.

DETAILED DESCRIPTION

Figure 1:
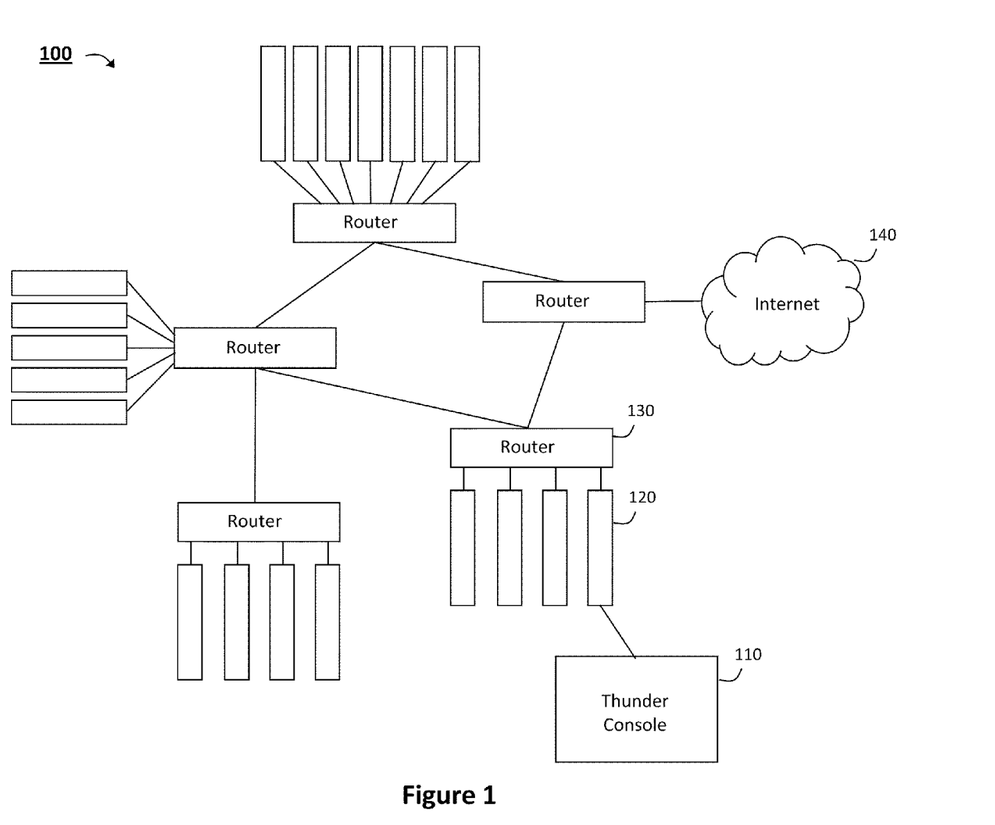
FIG. 1 illustrates a block diagram of an exemplary system for correlating network identities and addresses, according to one aspect of the invention.

According to one aspect of the invention, FIG. 1 illustrates a block diagram of an exemplary system for correlating network identities and addresses. In one implementation, the system 100 may generally include a log correlation engine 110 (e.g., the "Thunder console" shown in FIG. 1), wherein the log correlation engine 110 may receive various event logs from different sources 120 and 130 distributed across a network 100. For example, the different sources may include one or more firewalls, routers 130, servers 120, devices 120, operating systems, web browsers, applications, intrusion detection systems, authentication systems, honeypots, or other security monitoring systems. The log correlation engine 110 may then normalize and analyze the event logs, which may describe activity in the network 100, to learn relationships between identities and addresses in the network 100 and generate alerts in response to detecting changes in the learned relationships.

Additionally, in one implementation, an active vulnerability scanner (e.g., in a "Lightning console" 310 shown in FIG. 3) may scan hardware devices in the network 100 to learn network device addresses that can then be used to track changes and activity in the network 100, and further to control changes and activity in the network 100. Further, in one implementation, a passive vulnerability scanner (e.g., in the "Lightning console" 310 shown in FIG. 3) may observe traffic, sessions, or other activity that occurs in the network 100 to learn and track relationships between network identities and addresses. For example, the passive vulnerability scanner may include a packet sniffer that monitors traffic in the network 100 and sends logs describing the traffic to the log correlation engine 110 in real time, including time stamps describing when network sessions started, durations that the sessions lasted, source and destination addresses associated with the sessions, and amounts of data communicated during the sessions. The log correlation engine 110, the active vulnerability scanner, and the passive vulnerability scanner may therefore collectively provide various configuration and activity information that can be used to react quickly to incidents and trends that may impact security or compliance in the network 100.

In one implementation, as noted above, the system shown in FIG. 1 may correlate identities and addresses in the network 100 from information that various sources in the network 100 generate to describe activity that occurs in the network 100. In particular, the log correlation engine 110 may generally receive various event logs from different sources 120 and 130 distributed across the network 100 and identify one or more of the event logs that contain information describing network identities or Internet Protocol (IP) addresses for certain users. For example, the log correlation engine 110 may identify any of the logs that describe logins to authentication systems, authenticated emails, or any other activity that suitably identifies an IP address for a particular user. The log correlation engine 110 may then correlate information in the identified logs to maintain a mapping between users and IP addresses, and may further correlate information in various Dynamic Host Configuration Protocol (DHCP) logs to maintain a mapping between the IP addresses and Ethernet or Media Access Control (MAC) addresses. Thus, the user to IP address mapping and the IP address to Ethernet address mapping may be cross-referenced to learn relationships between the users, the IP addresses, and the Ethernet addresses. In one implementation, in response to discovering new or changed relationships between the users, the IP addresses, and the Ethernet addresses, the log correlation engine 110 may generate one or more alerts for further analysis.

Figure 2:
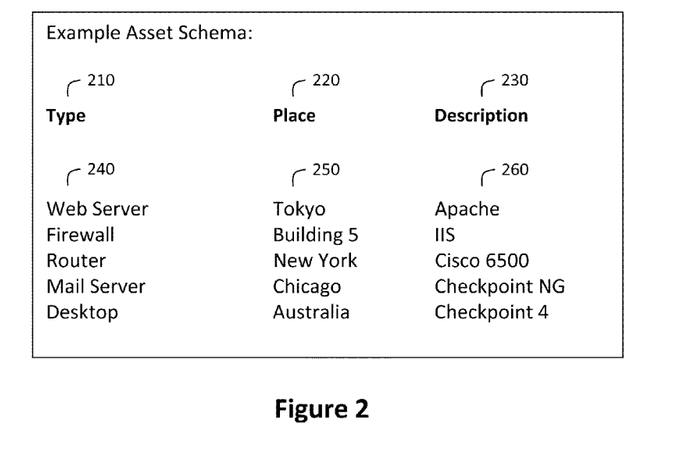
FIG. 2 illustrates an exemplary schema for representing assets in the system for correlating network identities and addresses, according to one aspect of the invention.

In one implementation, the system shown in FIG. 1 may further correlate identities and addresses in the network 100 to automatically track Ethernet addresses for various hardware devices in the network 100. In particular, the active vulnerability scanner may discover Ethernet addresses for various hosts or other devices in the network 100, including remote hosts or remote devices that communicate with the network 100 over the Internet 140. In addition, for any remote hosts or other devices running multiple hardware or virtual network interfaces, the active vulnerability scanner may discover multiple Ethernet addresses that correspond to the multiple network interfaces. The discovered Ethernet addresses may then be used to create dynamic asset lists that describe certain types of devices (e.g., a MAC prefix assigned to every CISCO® device may be used to automatically create an asset list describing the CISCO® devices in the network). For example, FIG. 2 illustrates an exemplary schema for representing hardware devices, virtual machines, hosts, or other assets in the network 100. In one implementation, one or more fields may be defined in the schema to represent the assets, including a type field 210, a place field 220 and a description field 230. The type field 210 may generally define a category that describes an asset class (e.g., web server, firewall, router, mail server, desktop, application, authentication system, etc.), the place field 220 may describe geographical locations for the assets (e.g., in general terms, such as "Australia" or "Chicago," or in narrow terms, such as "Building 5," or combinations thereof). Finally, the description field 230 may describe more specific information within the class associated with a particular asset (e.g., a particular asset in the network 100 may be described with "web server" 240 in the type field 210 and "Apache" 260 in the description field 230, while "Tokyo" 250 in the place field 220 may indicate that Tokyo corresponds to the geographic location for the Apache web server).

In one implementation, the passive vulnerability scanner may further track Ethernet addresses for any new hosts or devices in the network 100, wherein the new hosts or devices may be reported to the log correlation engine 110 in a log that contains Ethernet addresses observed in IP packets associated with the new hosts or devices. In one implementation, the log correlation engine 110 may then parse the logs reported from the passive vulnerability scanner in addition to any logs reported from DHCP sources, arpwatch sources, or other sources that contain Ethernet addresses. For example, a particular arpwatch log may generally describe pairings between IP addresses and MAC addresses in the network 100 and time stamps that describe when the pairings appeared on the network 100. Thus, the log correlation engine 110 may generate alerts in response to discovering that new hardware Ethernet addresses have become active in the network 100, whereby the active vulnerability scanner, the passive vulnerability scanner, and the log correlation engine 110 may collectively track hardware Ethernet addresses to monitor and control changes and activity in the network 100.

Thus, in one implementation, the system shown in FIG. 1 may correlate network identities and addresses in various ways, as will be described in further detail herein, which may enable organizations to fulfill compliance and security requirements in the network 100. In particular, many compliance regulations such as Payment Card Industry (PCI) and Federal Information Security Management Act (FISMA) require log aggregation, storage, and search capabilities, whereby vulnerability and configuration auditing requirements for such regulations can be fulfilled with event log searching and management capabilities provided by the system shown in FIG. 1. Furthermore, organizations subject to mandatory breach disclosure laws may fulfill requirements for disclosing breaches through direct access to the raw event logs, correlated events, configurations, and vulnerabilities. Moreover, the raw event logs, correlated events, configurations, and vulnerabilities may provide information that can help incident responders make immediate and correct decisions during a breach in the network 100, which can not only limit ongoing breaches in the network 100, but also minimize chances that the extent of the breaches will be over-reported or under-reported.

Figure 3:
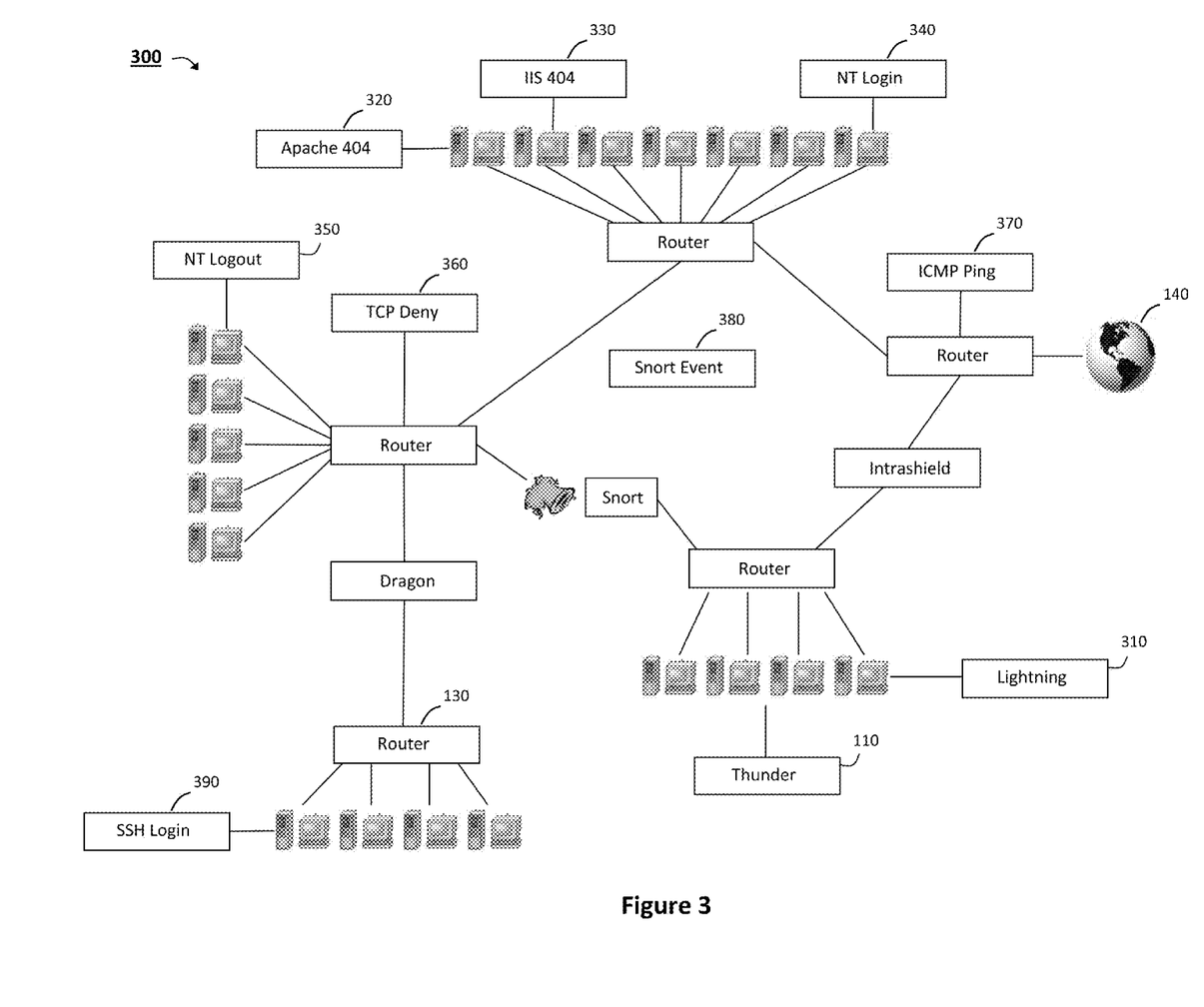
FIG. 3 illustrates an exemplary block diagram of the system for correlating network identities and addresses, according to one aspect of the invention.

According to one aspect of the invention, FIG. 3 illustrates an exemplary block diagram showing the system for correlating network identities and addresses in further detail. In particular, the system may further include an active vulnerability scanner and a passive vulnerability scanner within a vulnerability scanning system 310 (e.g., the "Lightning console" shown in FIG. 3). Although FIG. 3 shows the log correlation engine 110 deployed on a separate server from the vulnerability scanning system 310, the log correlation engine 110 and the vulnerability scanning system 310 may be deployed together on one particular server. In one implementation, the vulnerability scanning system 310 and the log correlation engine 110 may have a trusted relationship based on Secure Shell (SSH) communications.

In one implementation, as noted above, the log correlation engine 110 may aggregate, normalize, and correlate events in logs generated by various different sources distributed across the network 300. For example, the different sources may include an Apache server 404 that generates Apache events 320, an Internet Information Services (IIS) system 440 that generates IIS events 330, an authentication server that generates logs containing successful NT login events 340, NT logout events 350, successful SSH login events 390, login events with invalid, disabled, or deleted accounts, or other authentication events. In addition, the different sources may further include routers, switches, or other network devices that generate Transmission Control Protocol (TCP) deny events 360, Internet Control Message Protocol (ICMP) ping events 370, snort or other intrusion detection system (IDS) events 380, agents that execute on devices, applications, or hosts in the network 300, and information that the vulnerability scanning system 310 generates with the active vulnerability scanner and the passive vulnerability scanner.

The log correlation engine 110 may therefore receive logs containing events from various different hosts, devices, applications, and other systems in the network 300. As such, the log correlation engine 110 may normalize information in the logs to account for different transport mechanisms that the source devices may use. For example, certain firewalls may output logs in Open Platform for Security (OPSEC) or Simple Network Management Protocol (SNMP), whereas a particular CISCO® IDS may output logs in a proprietary CISCO® Post Office Protocol (POP). As such, the log correlation engine 110 may normalize the information contained in the logs into a common format. For example, in one implementation, the log correlation engine 110 may normalize the logs into "syslog" messages because routers, switches, wireless access points, UNIX servers, and other hosts typically produce syslog messages to forward events, while various suitable syslog utilities can be executed on WINDOWS® servers and other devices to produce events in the syslog message format (i.e., inter-device communications typically employ syslog messages or protocols for common denominators, making syslog a suitable message format for normalizing the logs). The log correlation engine 110 may then analyze the normalized logs to correlate network identities and addresses in the network 300, as described in further detail herein.

Figure 4:
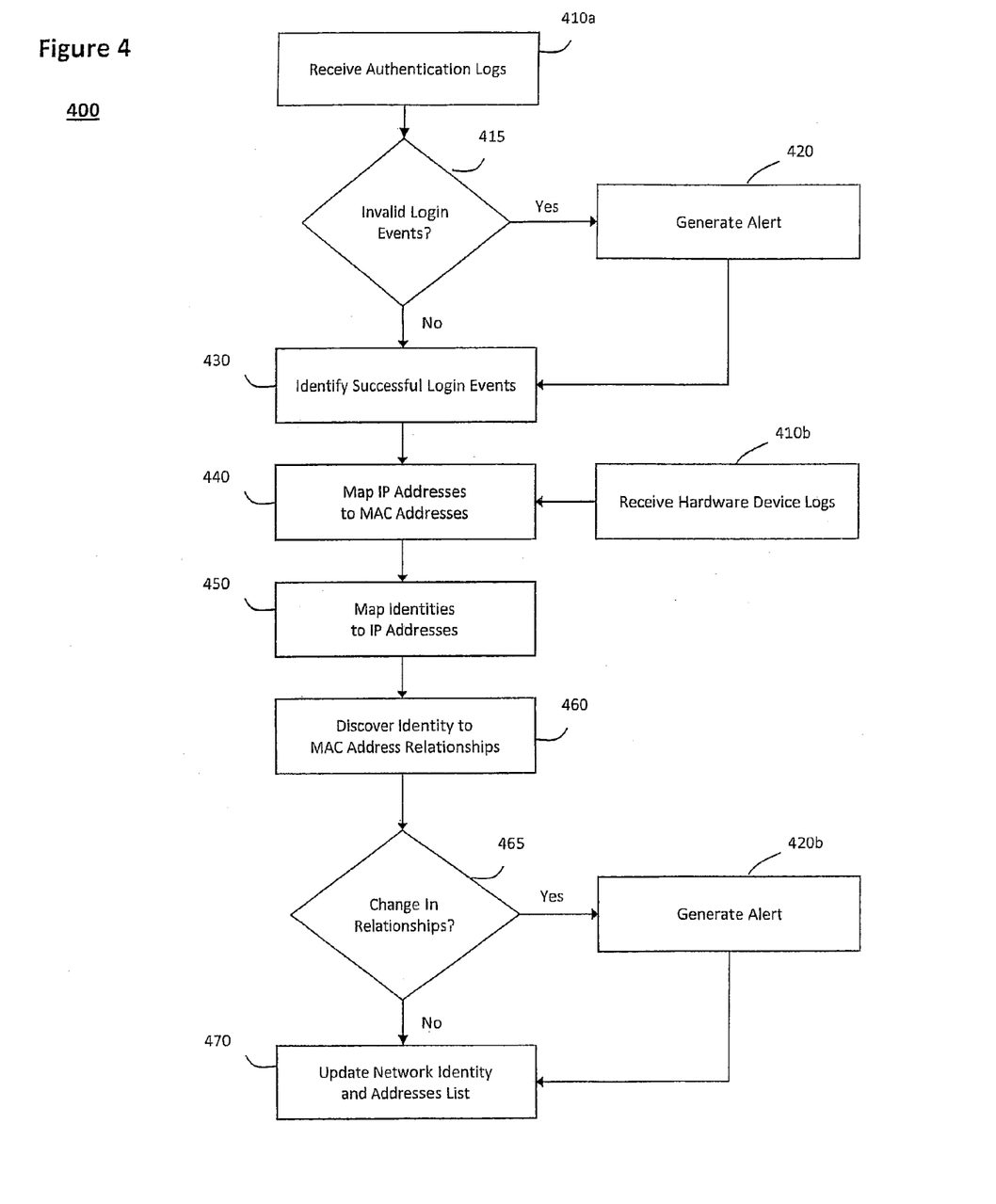
FIG. 4 illustrates an exemplary method for correlating network identities and addresses, according to one aspect of the invention.

According to one aspect of the invention, FIG. 4 illustrates an exemplary method 400 for correlating network identities and addresses. For example, in one implementation, the method 400 shown in FIG. 4 and described herein may correlate the network identities and addresses based on activity that occurs in a network to automatically track user identities and network addresses. In particular, a log correlation engine 110 may receive various authentication logs in an operation 410a from various different sources distributed across the network. In one implementation, the authentication logs may contain information describing relationships between user identities, IP addresses, and MAC or Ethernet addresses in the network, wherein the log correlation engine 110 may correlate the authentication logs with information in other event logs to learn new relationships between the user identities, IP addresses, and MAC or Ethernet addresses, discover changes in the relationships, and generate appropriate alerts in response to learning the new relationships or discovering the changes in the relationships. For example, the authentication logs may be received from various DHCP sources that generate events relating to DHCP activity in the network (e.g., events that relate to DHCP leases in UNIX, WINDOWS®, or other operating systems, DHCP activity in one or more firewalls, observed pairings between IP addresses and MAC addresses, etc.).

In addition, the log correlation engine 110 may further receive the authentication logs from various Active Directory sources, RADIUS sources, or other authentication sources that generate events relating to authentication activity in the network (e.g., events that relate to invalid login attempts, successful login attempts, user account changes, etc.). For example, the authentication logs may include events that describe activity relating to changes in privileges for a certain user, changes that add an account for a new user, changes that delete, disable, expire, or otherwise invalidate an account for an existing user, or other changes that may be relevant to user authentication. As such, in one implementation, the log correlation engine 110 may then normalize, parse, and otherwise correlate the authentication logs in an operation 415 to determine whether the authentication logs describe any invalid login events. In particular, the log correlation engine 110 may learn deleted, expired, disabled, or otherwise invalid login identities in response to receiving any events that describe such activity. Thus, in an operation 420, the log correlation engine 110 may generate an alert in response to determining that one or more of the received authentication logs describe events that relate to any attempted logins with the deleted, expired, disabled, or otherwise invalid login identities.

In one implementation, the authentication logs may then be further correlated in an operation 430 to identify any successful login events described in the authentication logs. In particular, the log correlation engine 110 may identify any logs that contain events describing successful logins to authentication systems, authenticated email applications, or other hosts to learn relationships between user identities, IP addresses, and MAC or Ethernet addresses. For example, the authentication logs may generally contain events describing activity in Active Directory, RADIUS, WINDOWS®, UNIX SSH, or other authenticated systems, Post Office Protocol (POP), Internet Message Access Protocol (IMAP), or other authenticated email applications, File Transfer Protocol (FTP) servers, passively sniffed GMAIL™, YAHOO™, chat, instant message, or other web applications, or any other activity that describes activity for a certain user identity. In one implementation, an operation 440 may include the log correlation engine 110 analyzing various DHCP logs to map IP addresses to MAC or Ethernet addresses, and in an operation 450, the authentication logs may be further analyzed to map user identities to IP addresses. In one implementation, in response to determining that a particular event described in a log does not contain a user identity, operation 450 may include the log correlation engine 110 assigning a default identity to the event that corresponds to an identity most recently observed for a network address associated with the event (e.g., if the event contains a source IP address, the default identity may be an identity most recently observed for the source IP address, or if the event contains a destination IP address but no source IP address, the default identity may be an identity most recently observed for the destination IP address). In other words, the mappings between user identities, network IP address, and network MAC addresses may be determined in various ways depending on information that the events in the log contain (e.g., events that contain an IP address or a MAC address but do not contain a user identity can be mapped to a user identity based on a known relationship between the user identity and one or more of the IP address or the MAC address contained in the event).

Thus, in one implementation, the information analyzed by the log correlation engine 110 in operations 440 and 450 may generally originate from various sources, including the passive vulnerability scanner, which may passively generate the user identity information through protocol analysis (e.g., as described in the U.S. Patent Applications incorporated by reference above). For example, in response to a user connecting to a GMAIL™ account for the first time, the passive vulnerability scanner may send a syslog message to the log correlation engine 110, which may then record a user identity and IP address from the message (e.g., "New Network User— user rongula@gmail.com has logged on from IP address 192.168.56.254"). Furthermore, the log correlation engine 110 may record various different "identities" that have been passively sniffed or extracted from log files, including multiple user identities that any particular individual may have (e.g., an individual may have different names and identities for public email, domain, and instant message accounts, whereby any particular identity may include full email addresses such as username@domain.com, or if the logs or the passively sniffed information describes activity in an authenticated email, the identity may include only the "username" portion).

Thus, in one implementation, an operation 460 may then include the log correlation engine 110 cross-referencing the IP addresses mapped to the MAC addresses with the user identities mapped to the IP addresses to discover relationships between the user identities, the IP addresses, and the MAC addresses (e.g., new or changed user to IP address relationships, new or changed user to MAC address relationships, new or changed IP address to MAC address relationships etc.). In one implementation, the log correlation engine 110 may determine whether any changes in the relationships between the users, IP addresses, and MAC addresses have been detected in an operation 465 and generate one or more alerts in an operation 420b in response to detecting any such changes. For example, in response to observing a successful login event from a MAC address different than a most recent MAC address observed for a particular user the log correlation engine 110 may generate a suitable alert describing the change in MAC address in operation 420b (e.g., in response to correlating a particular user with a successful login attempt from a laptop device having a MAC address different from a MAC address for a device previously associated with a successful login associated with the user). In another example, operation 420b may include the log correlation engine 110 generating an alert in response to discovering a relationship between a certain user name and IP address from an authentication event (e.g., a RADIUS event) and determining that the IP address already has a relationship to a certain MAC address (i.e., the relationship between the user name and the IP address may be cross-referenced with the relationship between the IP address and the MAC address to discover the relationship between the user name and the MAC address). In other examples, the alert may be generated in response to discovering that a new user identity accessed the network from an IP address previously associated with another user, a change to an existing MAC address related to a certain user identity, or any other appropriate circumstances indicating that a new or changed relationship has been discovered for a certain user identity, IP address, and/or MAC address.

In one implementation, an operation 470 may include the log correlation engine 110 continually updating a network identity and address list to reflect any new or changed relationships learned between certain user identities, IP addresses, and MAC addresses. Thus, the network identity and address list may generally describe most recent IP addresses and most recent MAC addresses for any suitable user identity based on activity observed in the network. Further, in one implementation, the network identity and address list may be updated to include a time stamp that describes a particular time when the new or changed relationships were learned (e.g., a local time described in one or more events that resulted in learning the new or changed relationships). For example, an alert generated in operation 420b may indicate that a new user was observed at a certain MAC address at a particular time, whereby the network identity and address list may be updated in operation 470 to include the particular time when the new user was observed at the MAC address. Thus, entries in the network identity and address list may generally describe relationships between certain user identities and network addresses, and may further describe relationships between IP and MAC network addresses. As such, in response to correlating any events that cross-reference a certain user identity, IP address, and MAC address, an appropriate alert describing a new or changed relationship between the user identity, the IP address, and the MAC address may be generated in operation 420b and the network identity and address list may be appropriately updated in operation 470. Furthermore, any suitable entry in the network identity and address list may include a hash value generated from a source IP address, user identity, and login type to provide an index that can be quickly referenced to determine whether the entry contains new or updated information.

Accordingly, in one implementation, the network identity and address list may be continually updated in response to any new or changed pairings between network identities, IP addresses, and MAC addresses, and furthermore, the network identity and address list may be queried to search for identities that had accesses to certain IP addresses, MAC addresses, or networks, or for identities that had access to the network addresses at certain times (e.g., using the time stamps in the network identity and address list, network identities that originated from certain IP addresses on particular dates or in particular time intervals may be obtained). For example, users may obtain new network addresses for various valid reasons (e.g., DHCP lease expirations, changing locations in a campus network, obtaining a new computer, etc.), or changes to the network addresses may indicate that user credentials have been compromised (e.g., anomalies in network addresses may indicate behavior associated with attempted leapfrog attacks, backdoor network intrusions, etc.). Further, as noted above, the relationships between the network identities and network addresses can be passively determined, whereby the relationships may be discovered in networks that otherwise lack systems having central authentication or network access control, while in DHCP networks or other environments where users can move devices from a physical local area network (LAN) to a wireless LAN, correlating the network identities and addresses may particularly identify network users that had certain network addresses and times that the users had such network addresses. Thus, correlating network identities and addresses may be used in various ways to respond to incidents, monitor compliance, or otherwise manage the network.

Furthermore, in one implementation, the method 400 shown in FIG. 4 may correlate network addresses with hardware devices to automatically track network addresses for the hardware devices. In particular, the active vulnerability scanner may discover MAC or Ethernet addresses for various hosts or other devices in the network, or in response to scanning any hosts or other devices running multiple hardware or virtual network interfaces, the active vulnerability scanner may discover multiple MAC or Ethernet addresses that correspond to the multiple network interfaces. Furthermore, in addition to any hosts located within the network, the active vulnerability scanner may discover MAC or Ethernet addresses for hosts that may be remote from the network under certain conditions. For example, in one implementation, the active vulnerability scanner may discover MAC or Ethernet addresses for any remote hosts located in the same collision domain as the active vulnerability scanner and with Address Resolution Protocol (ARP) "ping" enabled, remote hosts running WINDOWS® that can be queried using Server Message Block (SMB), remote hosts that run Linux or WINDOWS® and can be scanned using credentials, and remote hosts having network interfaces that can be enumerated using Simple Network Management (SNMP) or credentialed UNIX SSH scans.

In one implementation, the passive vulnerability scanner may further discover the MAC or Ethernet addresses for the hosts or other devices in the network and the hosts located remotely from the network. In particular, the passive vulnerability scanner may record MAC addresses for any new hosts described in sniffed activity, which may be useful to discover changes in server farms, demilitarized zones, or other locations that do not frequently have new hosts. Further, the passive vulnerability scanner may obtain the MAC addresses from passively sniffed IP packets, such that the IP packets may contain IP addresses that can be associated with the MAC addresses. In one implementation, the passive vulnerability scanner may be strategically deployed to observe traffic at certain locations in the network to detect new unique MAC addresses. For example, to detect new MAC addresses that identify firewalls, routers, or Network Address Translation (NAT) devices, the passive vulnerability scanner may be deployed at a perimeter of the network to monitor any inbound or outbound traffic, while deploying the passive vulnerability scanner on a span port for a core switch or router may effectively sniff new MAC addresses for devices that communicate with the switch or router.

In one implementation, the MAC or Ethernet addresses may further describe Universal Serial Bus (USB) devices, compact discs, and digital video discs that have been inserted into local or remote devices. For example, one or more agents that employ WINDOWS® Management Instrumentation (WMI) may be deployed in the network to automatically detect and monitor USB™, compact disc, and digital video disc activity, whereby the agents may generally detect and monitor media insertion and removal from local or remote devices. As such, the agents may detect USB™ devices, compact discs, digital video discs, or other media that can be mounted as volumes in response to the media having been inserted or removed into a device, which may provide information that can be used to ensure PCI compliance to protect cardholder data.

In one implementation, the discovered MAC or Ethernet addresses may then be reported to the log correlation engine 110, which may receive one or more hardware device logs containing the discovered MAC or Ethernet addresses in an operation 410b. The log correlation engine 110 may then analyze the hardware device logs in operations 440 through 470 in a similar manner as described above. As such, in addition to correlating user identities and network addresses, the log correlation engine 110 may further correlate hardware device identities with network addresses to identify new or changed relationships between the hardware device identities and the network addresses.

Implementations of the invention may be made in hardware, firmware, software, or various combinations thereof. The invention may also be implemented as instructions stored on a machine-readable medium, which may be read and executed using one or more processing devices. In one implementation, the machine-readable medium may include various mechanisms for storing and/or transmitting information in a form that can be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A computer system for correlating network identities and addresses, comprising:
at least one processing device coupled to a machine-readable storage medium with computer executable instructions for implementing a log correlation engine in a network, wherein the log correlation engine causes the at least one processing device to:
receive one or more logs that describe traffic observed on the network, wherein the network traffic includes one or more network sessions observed on the network;
identify an authentication event described in the one or more logs, wherein the authentication event includes a network identity and a first network address observed in the one or more network sessions;
map the first network address to a second network address from information in the one or more logs that describe the traffic observed in the network;
map the network identity to one or more of the first network address or the second network address from the information in the one or more logs that describe the traffic observed in the network; and
identify a relationship between the network identity, the first network address, and the second network address in response to mapping the first network address to the second network address and mapping the network identity to the first network address or the second network address, wherein a network identity and address list comprises a hash value generated from the first network address, the network identity, and a login type to provide an index that can be referenced to determine whether a corresponding entry in the network identity and address list includes new or updated information.

2. The system of claim 1, wherein the first network address includes an Internet Protocol address and the second network address includes a Media Access Control address.

3. The system of claim 1, wherein the log correlation engine further causes the at least one processing device to generate an alert in response to the identified relationship between the network identity, the first network address, and the second network address.

4. The system of claim 3, wherein the alert indicates that the network identity accessed the first network address or the second network address and that another network identity previously had a relationship to the first network address or the second network address.

5. The system of claim 1, wherein the log correlation engine further causes the at least one processing device to generate an alert in response to determining that the authentication event describes an invalid authentication event.

6. The system of claim 1, wherein the log correlation engine further causes the at least one processing device to update a network identity and address list in response to the identified relationship between the network identity, the first network address, and the second network address.

7. The system of claim 1, wherein the network identity and address list includes a time stamp that describes when the relationship between the network identity, the first network address, and the second network address was identified.

8. The system of claim 1, wherein the log correlation engine further causes the at least one processing device to:
identify a hardware device detection event described in the one or more logs, wherein the hardware device detection event includes a Media Access Control network address for a new hardware device that an active vulnerability scanner observes in the one or more network sessions; and
identify a relationship between the new hardware device and the Media Access Control network address.

9. The system of claim 1, wherein the log correlation engine further causes the at least one processing device to:
identify a hardware device detection event described in the one or more logs, wherein the hardware device detection event includes a Media Access Control network address for a new hardware device that an active vulnerability scanner detects in the network; and
identify a relationship between the new hardware device and the Media Access Control network address.

10. The system of claim 1, wherein the log correlation engine further causes the at least one processing device to:
identify a media activity event described in the one or more logs, wherein the media activity event describes an insertion or removal of a media device from another device in the network; and
generate an alert in response to the media activity event.

11. A method for correlating network identities and addresses, comprising:
distributing a log correlation engine on a network;

receiving, at the log correlation engine, one or more logs that describe traffic observed on the network, wherein the network traffic includes one or more network sessions observed on the network;

identifying, by the log correlation engine, an authentication event described in the one or more logs, wherein the authentication event includes a network identity and a first network address observed in the one or more network sessions;

mapping, by the log correlation engine, the first network address to a second network address from information in the one or more logs that describe the traffic observed in the network;

mapping, by the log correlation engine, the network identity to one or more of the first network address or the second network address from the information in the one or more logs that describe the traffic observed in the network; and identifying, by the log correlation engine, a relationship between the network identity, the first network address, and the second network address in response to mapping the first network address to the second network address and mapping the network identity to the first network address or the second network address, wherein a network identity and address list comprises a hash value generated from the first network address, the network identity, and a login type to provide an index that can be referenced to determine whether a corresponding entry in the network identity and address list includes new or updated information.

12. The method of claim 11, wherein the first network address includes an Internet Protocol address and the second network address includes a Media Access Control address.

13. The method of claim 11, further comprising generating an alert in response to the log correlation engine identifying the relationship between the network identity, the first network address, and the second network address.

14. The method of claim 13, wherein the alert indicates that the network identity accessed the first network address or the second network address and that another network identity previously had a relationship to the first network address or the second network address.

15. The method of claim 11, further comprising generating an alert in response to the log correlation engine determining that the authentication event describes an invalid authentication event.

16. The method of claim 11, further comprising updating a network identity and address list in response to the log correlation engine identifying the relationship between the network identity, the first network address, and the second network address.

17. The method of claim 11, wherein the network identity and address list includes a time stamp that describes when the relationship between the network identity, the first network address, and the second network address was identified.

18. The method of claim 11, further comprising:
identifying, by the log correlation engine, a hardware device detection event described in the one or more logs, wherein the hardware device detection event includes a Media Access Control network address for a new hardware device that an active vulnerability scanner observes in the one or more network sessions; and
identifying, by the log correlation engine, a relationship between the new hardware device and the Media Access Control network address.

19. The method of claim 11, further comprising:
identifying, by the log correlation engine, a hardware device detection event described in the one or more logs, wherein the hardware device detection event includes a Media Access Control network address for a new hardware device that an active vulnerability scanner detects in the network; and
identifying, by the log correlation engine, a relationship between the new hardware device and the Media Access Control network address.

20. The method of claim 11, further comprising:
identifying, by the log correlation engine, a media activity event described in the one or more logs, wherein the media activity event describes an insertion or removal of a media device from another device in the network; and
generating an alert in response to the log correlation engine identifying the media activity event.

* * * * *